Patented May 11, 1926.

1,584,125

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PRODUCING MILK OIL FROM SOUR CREAM.

No Drawing. Application filed April 5, 1924. Serial No. 704,351.

In a copending application filed by me on February 14, 1923, Serial No. 619,020, I have described and claimed a process of recovering oil from milk or cream which, generally stated, consists in evaporating off the water or condensing the cream until the water is removed, whereupon the emulsion is completely broken and only the oil, with light traces of solids not fat, remains. The present application is based upon a variation or modification of the process therein described, the nature and distinguishing features of which will be understood from the following considerations.

In my former application I was dealing only with the problem of recovering the oil form sweet cream. For this purpose the cream was thoroughly washed, as by passing it two or more times through a centrifugal cream separator with a relatively large volume of water, and then subjecting it to an evaporating process preferably by heating it in a vacuum until all of the water was removed. The product is a pure oil with slight traces of casein or solids not fat floating in it which owe their presence to the very small amount of skim milk which no amount of washing is effective to remove. This oil could then be filtered to remove the traces of solids present.

My present application deals with sour cream. It is well known that under existing conditions in the industry there are many establishments known as centralizers, to which cream collected by outlying stations is periodically shipped, but almost universally in a sour state, and cream in such state is not adapted to be treated by the above described process, because it is not practicable or even possible to remove the curd or solids not fat from the fat by the use of centrifugal separators for washing, as these would almost immediately clog up, while the entanglement of the fat and curds renders useless dilution or gravity for the separation of the excess solids not fat. While it would obviously be advantageous to remove to any extent possible this excess of such solids, I have found that this is not essential but that the sour cream may be directly subjected to condensation or evaporation with the result that when all the water is removed nothing but the oil remains, with thoroughly coagulated curds therein which are in such condition that they may be readily separated out and recovered in a useful state by filtration.

For example, a sour cream containing 40 per cent milk fat and 60 per cent milk serum, or skim milk, may be placed in an evaporating apparatus either with or without a vacuum and by the application of heat the water may be entirely removed. As a result of such evaporation I have found that two changes take place: (1) the curds become more thoroughly coagulated so that they are transformed from soft and dispersed particles into hard and concentrated masses floating in the cream—this change occurs gradually as a result of the continued application of heat; (2) the fat globules, because the water, the fluid in which they are suspended, is all removed by evaporation, are forced closer and closer together until their surfaces come in actual contact, whereupon coalescence takes place. The removal of all the water is followed by complete coalescence, and oil results.

The oil thus produced is a yellow oil containing solid particles of hard concentrated curd. I have found that if this product be passed through a suitable filter, practically all the oil will pass through the same, leaving the dried curds collected on the filtering surface.

As I have elsewhere pointed out, the fat globules in normal cream when in actual contact occupy 80 per cent of the space in a confining vessel. The remaining 20 per cent of space is accounted for by the spaces between the globules. If, therefore, sour cream of 40 per cent fat is heated and evaporated to bring the fat concentration to 80 per cent, so that the solids not fat and water occupy a space of only 20 per cent, then the surfaces of the globules will be in actual contact. If, therefore, the evaporating process be continued until the fat concentration exceeds 80 per cent, it is manifest that the fat globules are no longer spherical but that the concentration has brought them more closely together, or in other words, their surfaces become flattened and actual coalescence has taken place. Further evaporation of the water brings about still closer union of the fat particles, so that finally complete coalescent results and the emulsion is entirely broken. The final reaction must be one in which the oil is formed and in this oil the solids not fat remain suspended.

Such a product may obviously be subjected to the usual filtering process for the recovery of practically pure oil and curds. The evaporation may be effected by such vacuum pans as are commonly used in factories manufacturing condensed or evaporated milk, and no specifically designed filter is required to effect the final separation.

What I claim is:

1. The process of recovering oil from sour cream, which consists in evaporating such cream until all the water is removed and complete coalescence of the fat globules results, and then filtering the resulting oil to separate out the curds suspended therein.

2. The process of recovering oil from sour cream, which consists in evaporating off the water therefrom by the continued application of heat which solidifies the solids not fat until all the water is removed and complete coalescence of the fat globules results, and then filtering the resulting oil to separate out the curds suspended therein.

In testimony whereof I hereto affix my signature.

CHARLES E. NORTH.